United States Patent
Kim (10) Patent No.: US 10,838,055 B2
(45) Date of Patent: Nov. 17, 2020

(54) METHOD AND APPARATUS TO IDENTIFY OBJECT

(71) Applicant: Samsung Electronics Co., Ltd., Suwon-si (KR)

(72) Inventor: Byung Kwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 15/874,114

(22) Filed: Jan. 18, 2018

(65) Prior Publication Data
US 2019/0064337 A1    Feb. 28, 2019

(30) Foreign Application Priority Data

Aug. 28, 2017  (KR) .................. 10-2017-0108469

(51) Int. Cl.
*G01S 13/42*   (2006.01)
*G01S 7/02*    (2006.01)
(Continued)

(52) U.S. Cl.
CPC .............. *G01S 13/42* (2013.01); *G01S 7/025* (2013.01); *G01S 7/026* (2013.01); *G01S 7/41* (2013.01);
(Continued)

(58) Field of Classification Search
CPC .......... G01S 13/42; G01S 7/025; G01S 7/026; G01S 7/41; G01S 7/411; G01S 7/417;
(Continued)

(56) References Cited

U.S. PATENT DOCUMENTS

| | | | | |
|---|---|---|---|---|
| 4,468,656 A | * | 8/1984 | Clifford | ............. G08B 21/0415 340/294 |
| 5,093,649 A | * | 3/1992 | Johnson | ................ G01S 7/2813 342/157 |

(Continued)

FOREIGN PATENT DOCUMENTS

| | | | | |
|---|---|---|---|---|
| JP | 2010-197337 A | | 9/2010 | |
| JP | 2010197337 A | * | 9/2010 | ............. G01S 13/90 |

(Continued)

*Primary Examiner* — Bernarr E Gregory
*Assistant Examiner* — Nuzhat Pervin
(74) *Attorney, Agent, or Firm* — NSIP Law (57) ABSTRACT

A method and apparatus to identify an object include extracting first location information, second location information, and motion information of an object from a polarimetric RADAR signal that is reflected from the object. Each of the first location information, the second location information, and the motion information correspond to each of polarized waves. The apparatus and the method also include generating a first image and a second image, combining the first image and the second image to generate first composite images, each corresponding to each of the polarized waves, and identifying the object using a neural network based on the first composite images. The first image corresponds to each of the polarized waves and includes the first location information and the second location information, and the second image corresponds to each of the polarized waves and includes the first location information and the motion information.

20 Claims, 8 Drawing Sheets

(51) Int. Cl.
*G01S 7/41* (2006.01)
*G06N 3/02* (2006.01)
*G01S 13/34* (2006.01)
*G01S 13/89* (2006.01)
*G01S 13/90* (2006.01)
*G06N 3/08* (2006.01)
*G06N 3/04* (2006.01)
*G01S 13/58* (2006.01)

(52) U.S. Cl.
CPC .............. *G01S 7/411* (2013.01); *G01S 7/417* (2013.01); *G01S 13/346* (2013.01); *G01S 13/89* (2013.01); *G01S 13/90* (2013.01); *G06N 3/02* (2013.01); *G06N 3/04* (2013.01); *G06N 3/084* (2013.01); *G01S 13/58* (2013.01)

(58) Field of Classification Search
CPC ........ G01S 13/346; G01S 13/89; G01S 13/90; G01S 13/58; G06N 3/02; G06N 3/04; G06N 3/084
USPC ......................................................... 342/188
See application file for complete search history.

(56) References Cited

U.S. PATENT DOCUMENTS

| | | | | |
|---|---|---|---|---|
| 5,187,687 A * | 2/1993 | Burckhardt | ......... | G01S 7/52025 367/11 |
| 5,552,787 A * | 9/1996 | Schuler | .................. | G01S 7/024 342/25 A |
| 5,656,932 A * | 8/1997 | Kitayoshi | ............... | G01R 29/08 324/615 |
| 6,750,805 B1 * | 6/2004 | Cameron | ................ | G01S 7/024 342/195 |
| 7,345,625 B1 * | 3/2008 | Urkowitz | ................ | G01S 7/026 342/159 |
| 7,751,595 B2 * | 7/2010 | Russo | .................... | G06Q 10/02 382/115 |
| 7,948,429 B2 * | 5/2011 | Drake | ................... | G01S 13/424 342/26 R |
| 8,125,370 B1 * | 2/2012 | Rogers | ................. | G01S 13/904 342/25 F |
| 8,217,368 B2 * | 7/2012 | Meyers | ................. | G01N 21/21 250/459.1 |
| 8,913,149 B1 * | 12/2014 | Georges, III | ......... | G06T 3/4053 348/222.1 |
| 10,043,268 B2 * | 8/2018 | Yoshida | ................ | G06T 7/0012 |
| 2003/0126448 A1 * | 7/2003 | Russo | .................. | H04L 9/3231 713/186 |
| 2004/0032361 A1 * | 2/2004 | Kirscht | ............... | G01S 13/9029 342/25 R |
| 2005/0156659 A1 * | 7/2005 | Wintermantel | .......... | H03H 7/21 327/532 |
| 2005/0264813 A1 * | 12/2005 | Giakos | ................... | B82Y 20/00 356/369 |
| 2006/0036353 A1 * | 2/2006 | Wintermantel | .... | H03H 17/0263 700/300 |
| 2007/0024489 A1 * | 2/2007 | Cerwin | ................... | G01S 13/90 342/22 |
| 2007/0205936 A1 * | 9/2007 | McMakin | ................ | H01Q 1/22 342/22 |
| 2007/0274575 A1 * | 11/2007 | Russo | .................... | G06Q 20/04 382/124 |
| 2009/0224993 A1 * | 9/2009 | Peichl | ...................... | H01Q 3/10 343/761 |
| 2011/0169943 A1 * | 7/2011 | Bachman, II | ......... | G08G 5/045 348/117 |
| 2011/0237939 A1 * | 9/2011 | Melamed | ................. | G06T 5/50 600/425 |
| 2012/0075432 A1 * | 3/2012 | Bilbrey | .................. | H04N 13/25 348/48 |
| 2012/0112096 A1 * | 5/2012 | Meyers | ................... | G01N 21/64 250/459.1 |
| 2014/0275986 A1 * | 9/2014 | Vertikov | ................. | A61B 8/12 600/424 |
| 2015/0198703 A1 * | 7/2015 | Karam | ..................... | G01S 7/499 342/27 |
| 2015/0281587 A1 * | 10/2015 | Furuta | ....................... | B60R 1/00 348/240.2 |
| 2016/0003935 A1 * | 1/2016 | Stainvas Olshansky | | ..................... G01S 13/931 342/70 |
| 2016/0025839 A1 * | 1/2016 | Trummer | ............. | H01Q 1/3233 342/109 |
| 2016/0084955 A1 * | 3/2016 | Stainvas Olshansky | | ..................... G01S 13/89 342/191 |
| 2016/0349363 A1 * | 12/2016 | Millar | .................... | G01S 13/449 |
| 2017/0010353 A1 * | 1/2017 | Soofi | ....................... | G01S 7/024 |
| 2018/0106898 A1 * | 4/2018 | Baskaran | ............ | G01S 7/4802 |
| 2018/0335518 A1 * | 11/2018 | Fox | ......................... | G01S 7/025 |
| 2019/0041493 A1 * | 2/2019 | Greenberg | ............. | G01S 7/026 |
| 2020/0072764 A1 * | 3/2020 | Vacanti | .................. | G01N 22/00 |

FOREIGN PATENT DOCUMENTS

| | | | | |
|---|---|---|---|---|
| JP | 2010230462 A | * | 10/2010 | ............. G01S 13/90 |
| JP | 2012-63196 A | | 3/2012 | |
| JP | 2012063196 A | * | 3/2012 | ............. G01S 13/90 |
| JP | 2013096807 A | * | 5/2013 | ............. G01S 13/90 |
| WO | WO-2012044619 A1 | * | 4/2012 | ........... H04N 13/243 |

* cited by examiner

METHOD AND APPARATUS TO IDENTIFY OBJECT

CROSS-REFERENCE TO RELATED APPLICATIONS

This application claims the benefit under 35 USC § 119(a) of Korean Patent Application No. 10-2017-0108469, filed on Aug. 28, 2017, in the Korean Intellectual Property Office, the entire disclosure of which is incorporated herein by reference for all purposes.

BACKGROUND

1. Field

The following description relates to an apparatus and a method of identifying an object using a neural network.

2. Description of Related Art

A quantity of data transmitted by a polarimetric RADAR is four times that of a single-polarization RADAR. In a polarimetric RADAR, required data is selectively used depending on the purpose of use. For example, a range-Doppler map includes range information and velocity information, and a micro-Doppler analysis includes velocity information.

SUMMARY

This Summary is provided to introduce a selection of concepts that are further described below in the Detailed Description in simplified form. This Summary is not intended to identify key features or essential features of the claimed subject matter, nor is it intended to be used as an aid in determining the scope of the claimed subject matter.

In accordance with an embodiment, there is provided a method of identifying an object, the method including: extracting first location information, second location information, and motion information of an object from a polarimetric RADAR signal that may be reflected from the object, wherein each of the first location information, the second location information, and the motion information correspond to each of polarized waves; generating a first image and a second image, wherein the first image corresponds to each of the polarized waves and may include the first location information and the second location information, and the second image corresponds to each of the polarized waves and may include the first location information and the motion information; combining the first image and the second image to generate first composite images, each corresponding to each of the polarized waves; and identifying the object using a neural network based on the first composite images.

The method may be further include: generating a second composite image by combining the first composite images to the neural network to identify the object.

The first location information may be range information, the second location information may be angle information, the first image may be a range-angle image, and the second image may be a range-velocity image.

The first location information may be vertical direction information, the second location information may be horizontal direction information, the first image may be a vertical direction-horizontal direction image, and the second image may be a vertical direction-velocity image.

The method may be further include: in response to determining that a signal-to-noise ratio (SNR) of the polarimetric RADAR signal satisfies a criterion, determining the first location information to be range information, determining the second location information to be angle information, determining the first image to be a range-angle image, and determining the second image to be a range-velocity image, and in response to determining that the SNR being does not satisfy the criterion, determining the first location information to be vertical direction information, determining the second location information to be horizontal direction information, determining the first image to be a vertical direction-horizontal direction image, and determining the second image to be a vertical direction-velocity image.

The polarimetric RADAR signal may include a vertical/vertical (V/V) polarization signal, a vertical/horizontal (V/H) polarization signal, a horizontal/vertical (H/V) polarization signal and a horizontal/horizontal (H/H) polarization signal.

The polarimetric RADAR signal may include a left-handed circular polarization (LHCP)/right-handed circular polarization (RHCP) signal, an LHCP/LHCP signal, an RHCP/LHCP signal, and an RHCP/RHCP signal.

The method of claim 1, may be further include: generating differential images between the first composite images; and generating a third composite image by combining the differential images to the neural network to identify the object.

The method may be further include: generating cross-correlation images between the first composite images; and generating a fourth composite image by combining the cross-correlation images to the neural network to identify the object.

In accordance with an embodiment, there is provided a non-transitory computer-readable storage medium storing instructions that, when executed by a processor, cause the processor to perform the method described above.

In accordance with an embodiment, there is provided an apparatus to identify an object, the apparatus including: a processor configured to extract first location information, second location information, and motion information of an object from a polarimetric RADAR signal reflected from the object, wherein each of the first location information, the second location information and the motion information correspond to each of polarized waves in a multi-polarization; generate a first image and a second image, wherein the first image corresponds to each of the polarized waves and may include the first location information and the second location information, and the second image corresponds to each of the polarized waves and may include the first location information and the motion information;

combine the first image and the second image to generate first composite images, each corresponding to each of the polarized waves; and identify the object using a neural network based on the first composite images.

The processor may be further configured to generate a second composite image by combining the first composite images to the neural network to identify the object.

The first location information may be range information, the second location information may be angle information, the first image may be a range-angle image, and the second image may be a range-velocity image.

The first location information may be vertical direction information, the second location information may be horizontal direction information, the first image may be a vertical direction-horizontal direction image, and the second image may be a vertical direction-velocity image.

The processor may be further configured to determine whether a signal-to-noise ratio (SNR) of the polarimetric RADAR signal satisfies a predetermined criterion, in response to the SNR being determined to satisfy the criterion, the processor determines the first location information to be range information, the second location information to be angle information, the first image to be a range-angle image, and the second image to be a range-velocity image, and in response to the SNR being determined not to satisfy the criterion, the processor determines the first location information to be vertical direction information, the second location information to be horizontal direction information, the first image to be a vertical direction-horizontal direction image, and the second image to be a vertical direction-velocity image.

The polarimetric RADAR signal may include a vertical/vertical (V/V) polarization signal, a vertical/horizontal (V/H) polarization signal, a horizontal/vertical (H/V) polarization signal and a horizontal/horizontal (H/H) polarization signal.

The polarimetric RADAR signal may include a left-handed circular polarization (LHCP)/right-handed circular polarization (RHCP) signal, an LHCP/LHCP signal, an RHCP/LHCP signal, and an RHCP/RHCP signal.

The processor may be further configured to generate differential images between the first composite images, and to generate a third composite image by combining the differential images to the neural network to identify the object.

The processor may be further configured to generate cross-correlation images between the first composite images, and to generate a fourth composite image by combining the cross-correlation images to the neural network to identify the object.

The apparatus may be further include: a transmission antenna configured to radiate the polarimetric RADAR signal to the object; and a reception antenna configured to receive the reflected polarimetric RADAR signal from the object.

Other features and aspects will be apparent from the following detailed description, the drawings, and the claims.

Throughout the drawings and the detailed description, the same reference numerals refer to the same elements. The drawings may not be to scale, and the relative sizes, proportions, and depictions of elements in the drawings may be exaggerated for the purpose of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings. In the following description, it should be noted that the same elements will be designated by the same reference numerals, wherever possible, even though they are shown in different drawings.

Figure 1:
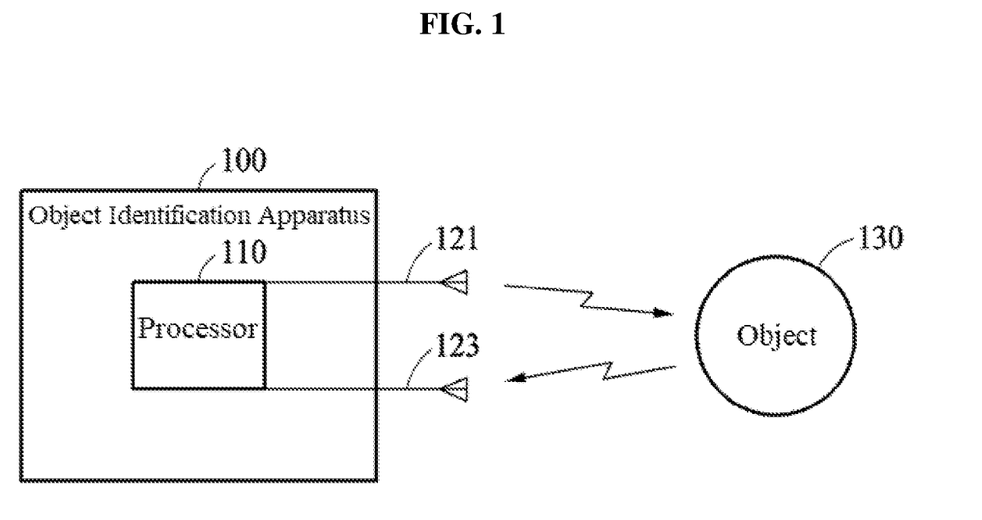
FIG. 1 illustrates an example of a configuration of a system to identify an object.

FIG. 1 illustrates an example of a configuration of a system to identify an object.

Referring to FIG. 1, an object identification apparatus 100 uses a single-channel image by using a neural network, and generates a composite image including an amount of information sufficient to identify an object 130 by combining velocity information with the single-channel image. The object identification apparatus 100 identifies the object 130 based on the composite image.

The object identification apparatus 100 includes a transmission antenna 121, a reception antenna 123 and a processor 110. The transmission antenna 121 radiates or transmits a polarimetric RADAR signal to an object 130. The reception antenna 123 receives a polarimetric RADAR signal that is reflected from the object 130 and that returns to the object identification apparatus 100. The processor 110 identifies a location or shape of the object 130 based on the received polarimetric RADAR signal. In the present disclosure, the term "RADAR" is an acronym for "radio detection and ranging."

The object identification apparatus 100 generates a single-channel image from pieces of location information for each polarized wave based on the polarimetric RADAR signal, and generates a two-channel image by combining the single-channel image with velocity information. The object identification apparatus 100 generates a single image by combining two-channel images for each polarized wave, inputs the generated image to a pre-trained neural network, and identifies an object represented by the image.

The neural network is referred to as an "artificial neural network." The neural network is a recognition model or a recognition process or method implemented by hardware that mimics a calculation ability of a biological system using a large number of artificial neurons (or nodes). The neural network performs a human cognition or learning process using the artificial neurons. The neural network includes, for example, a deep neural network, a convolutional neural network or a recurrent neural network. For example, the neural network is trained using or based on training data acquired through an error backpropagation algorithm.

In an example, the polarimetric RADAR signal includes a vertical/vertical (V/V) polarization signal, a vertical/horizontal (V/H) polarization signal, a horizontal/vertical (H/V) polarization signal and a horizontal/horizontal (H/H) polarization signal. In another example, the polarimetric RADAR signal includes a left-handed circular polarization (LHCP)/right-handed circular polarization (RHCP) signal, an LHCP/LHCP signal, an RHCP/LHCP signal, and an RHCP/RHCP signal. Different types of polarized signals or waves do not affect each other.

The object identification apparatus 100 extracts range information, angle information or velocity information from the polarimetric RADAR signal, for each polarized wave. A type of polarizations includes, for example, four pairs of vertical polarizations and horizontal polarizations, or four pairs of LHCPs and RHCPs.

In an example, the object identification apparatus 100 generates a two-dimensional (2D) range-angle image based on the range information and the angle information for each polarized wave. A range-angle image includes, for example, a real aperture RADAR (RAR) image. In another example, the object identification apparatus 100 generates a 2D vertical distance-horizontal distance image based on vertical distance information and horizontal distance information for each polarized wave. A vertical distance-horizontal distance image includes, for example, a synthetic-aperture RADAR (SAR) image.

Also, the object identification apparatus 100 generates a three-dimensional (3D) first composite image by synthesizing the velocity information with a 2D image. The object identification apparatus 100 inputs the 3D first composite image to a neural network trained through deep learning, and identifies an object represented in the 3D first composite image. An artificial intelligence function that imitates the workings of the human brain in processing data and creating patterns for use in decision making. Deep learning is a subset of machine learning in Artificial Intelligence (AI) that has networks which are capable of learning unsupervised from data that is unstructured or unlabeled. An image processing algorithm, according to a related art, uses a three-channel image including RGB information and, as a result, data loss occurs due to a polarimetric RADAR signal that provides four-channel information. The object identification apparatus 100, in accordance with an example of the present disclosure, processes a single-channel image using the neural network and, thus, the object identification apparatus 100 makes it possible to select desired information from a polarimetric RADAR signal and to reduce data loss.

The object identification apparatus 100 generates a two-channel image by reflecting the velocity information in the single-channel image. Thus, the object identification apparatus 100 synthesizes the velocity information with an insufficient amount of information in the single-channel image to provide a two-channel image including a more sufficient amount of information to the neural network. Thus, an accuracy of an object identification result of the neural network is enhanced.

In another example, the object identification apparatus 100 increases a number of transmitters of a polarimetric RADAR and a number of receivers of the polarimetric RADAR. The object identification apparatus 100 extracts more diverse information from polarimetric RADAR signals using a multiple-input and multiple-output (MIMO) technology and a virtual array technology.

Figure 2:
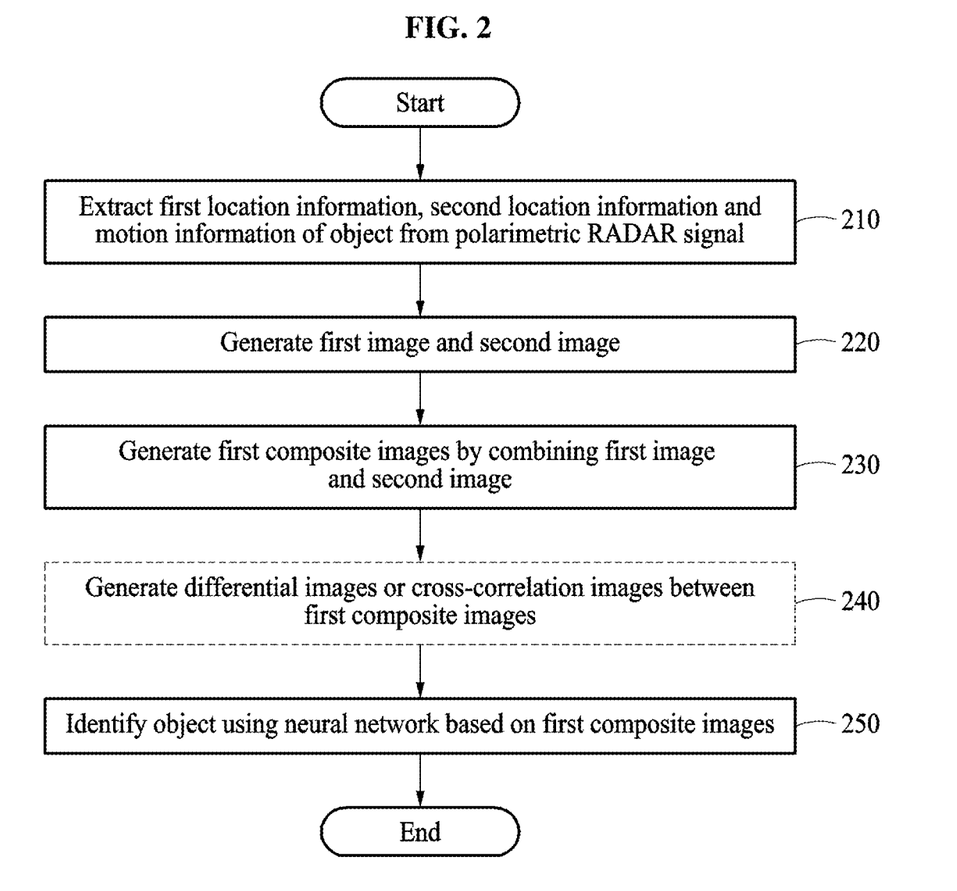
FIG. 2 is a flowchart illustrating an example of a method of identifying an object.

FIG. 2 illustrates an example of a method of identifying an object.

Referring to FIG. 2, in operation 210, the object identification apparatus 100 of FIG. 1 extracts first location information, second location information and motion information of an object from a polarimetric RADAR signal that is reflected from the object and that returns to the object identification apparatus 100. Each of the first location information, the second location information, and the motion information corresponds to each of polarized waves in a multi-polarization. For example, the object identification apparatus 100 receives a signal of each of the polarized waves via a polarimetric RADAR antenna, stores the signal as a digital signal, and extracts information, for example, a range, an angle or a velocity, from signals for each of the polarized waves, using various processes.

In operation 220, the object identification apparatus 100 generates a first image and a second image. The first image corresponds to each of the polarized waves, and includes the first location information and the second location information. The second image corresponds to each of the polarized waves, and includes the first location information and the motion information.

For example, when the polarimetric RADAR signal includes a vertical/vertical (V/V) polarization signal, a vertical/horizontal (V/H) polarization signal, a horizontal/vertical (H/V) polarization signal, and a horizontal/horizontal (H/H) polarization signal, the object identification apparatus 100 generates four first images for each of the polarized waves. In this example, each of the four first images has a single channel, instead of three channels, for example, RGB channels. The object identification apparatus 100 synthesizes velocity information with each of the four first images. As a result, four second images of two channels, that is, a channel of image information and a channel of velocity information are generated.

In an example, when the first location information is range information and when the second location information is angle information, the first image is a range-angle image and the second image is range-velocity image. In this example, the first image is an RAR image.

In another example, when the first location information is vertical distance information and when the second location information is horizontal distance information, the first image is a vertical distance-horizontal distance image, and the second image is a vertical direction-velocity image. In this example, the first image is an SAR image.

In operation 230, the object identification apparatus 100 generates first composite images each corresponding to each of the polarized waves by combining the first image and the second image.

In operation 250, the object identification apparatus 100 identifies the object using a neural network based on the first composite images.

The object identification apparatus 100 generates a second composite image by combining the first composite images. For example, the object identification apparatus generates a second composite image of eight channels by combining four first composite images of two channels. The object identification apparatus 100 inputs the second composite image to the neural network and identifies the object.

In operation 240, the object identification apparatus 100 generates differential images between the first composite images or cross-correlation images between the first composite images. The object identification apparatus 100 generates a third composite image by combining differential images. The object identification apparatus 100 inputs the third composite image to the neural network and identifies the object.

The object identification apparatus 100 generates a fourth composite image by combining cross-correlation images. The object identification apparatus 100 inputs the fourth composite image to the neural network and identifies the object. The neural network has a structure to receive a multi-channel image generated by synthesizing or combining polarization information, velocity information, or additional information.

Figure 3:
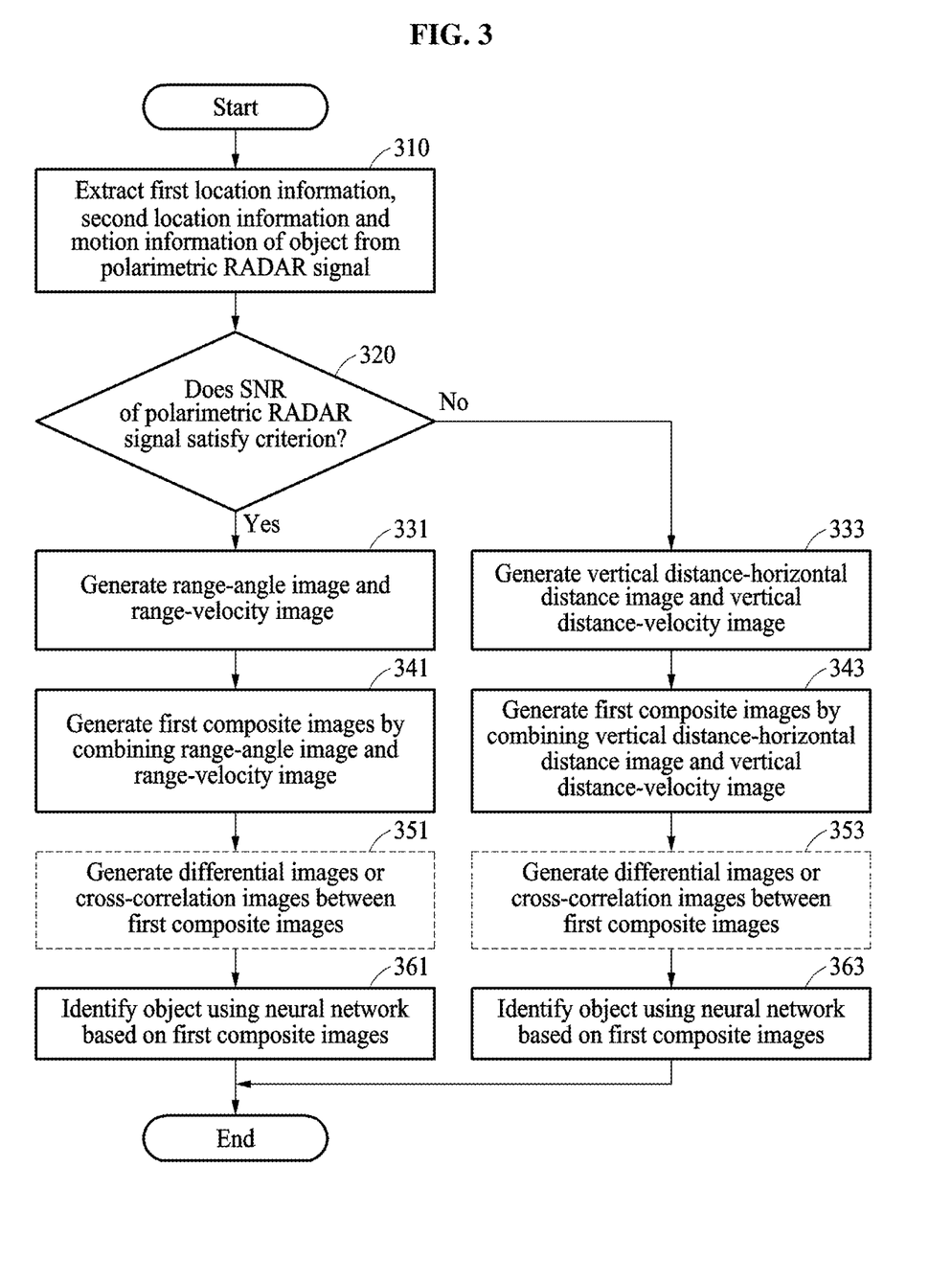
FIG. 3 is a flowchart illustrating another example of a method of identifying an object.

FIG. 3 illustrates another example of a method of identifying an object.

Referring to FIG. 3, in operation 310, the object identification apparatus 100 of FIG. 1 extracts first location information, second location information, and motion information of an object from a polarimetric RADAR signal that is reflected from the object and that returns to the object identification apparatus 100. Each of the first location information, the second location information, and the motion information corresponds to each of polarized waves in a multi-polarization.

In operation 320, the object identification apparatus 100 determines whether a signal-to-noise ratio (SNR) of the polarimetric RADAR signal satisfies a predetermined criterion. For example, the object identification apparatus 100 determines whether an SAR image with a high accuracy is required or a range-angle image that allows a fast detection is required.

The object identification apparatus 100 generates an SAR image or a range-angle image based on situation information including an object. For example, the situation information includes a propagation environment or a number of targets, and the propagation environment is represented by the SNR of the polarimetric RADAR signal. The SAR image and the range-angle image are different from each other in a resolution and a processing speed. The object identification apparatus 100 uses a range-angle image-based algorithm to obtain a fast result, and uses an SAR image to obtain an accurate result.

In operation 331, in response to the SNR satisfying the criterion, the object identification apparatus 100 generates a range-angle image and a range-velocity image. The range-angle image corresponds to each of the polarized waves and includes range information and angle information that each correspond to each of the polarized waves. The range-velocity image corresponds to each of the polarized waves and includes the range information and the motion information.

The range-angle image is, for example, an RAR image. When the SNR satisfies the criterion, the range information is the first location information, the angle information is the second location information, the range-angle image is generated as a first image, and the range-velocity image is generated as a second image. The criterion is used to determine whether the SNR is less than a threshold. In operation 341, the object identification apparatus 100 generates first composite images each corresponding to each of the polarized waves by combining the range-angle image and the range-velocity image. In operation 351, the object identification apparatus 100 generates differential images or cross-correlation images between the first composite images. In operation 361, the object identification apparatus 100 identifies the object using a neural network based on the first composite images. For example, the object identification apparatus 100 inputs the first composite images to the neural network, and identifies the object.

In operation 333, in response to the SNR not satisfying the criterion, the object identification apparatus 100 generates a vertical distance-horizontal distance image and a vertical direction-velocity image. The vertical distance-horizontal distance image corresponds to each of the polarized waves, and includes vertical distance information and horizontal distance information that each correspond to each of the polarized waves. The vertical direction-velocity image corresponds to each of the polarized waves, and includes the vertical distance information and the motion information. The vertical distance-horizontal distance image is, for example, an SAR image. When the SNR does not satisfy the criterion, the vertical distance information is the first location information, the horizontal distance information is the second location information, the vertical distance-horizontal distance image is generated as a first image, and the vertical direction-velocity image is generated as a second image. The criterion is used to determine whether the SNR is less than a threshold.

In operation 343, the object identification apparatus 100 generates first composite images each corresponding to each of the polarized waves by combining the vertical distance-horizontal distance image and the vertical direction-velocity image. In operation 353, the object identification apparatus 100 generates differential images or cross-correlation images between the first composite images. In operation 363, the object identification apparatus 100 identifies the object using a neural network based on the first composite images. For example, the object identification apparatus 100 inputs the first composite images to the neural network, and identifies the object.

Figure 4A:
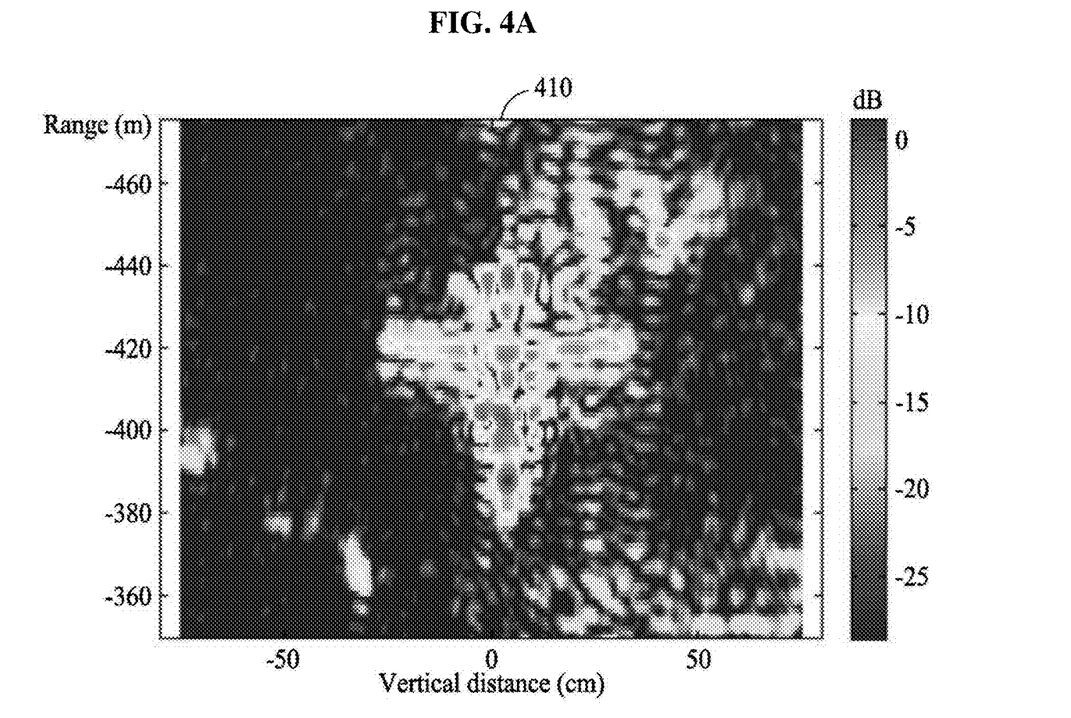
FIG. 4A illustrates an example of a range-angle image.
Figure 4B:
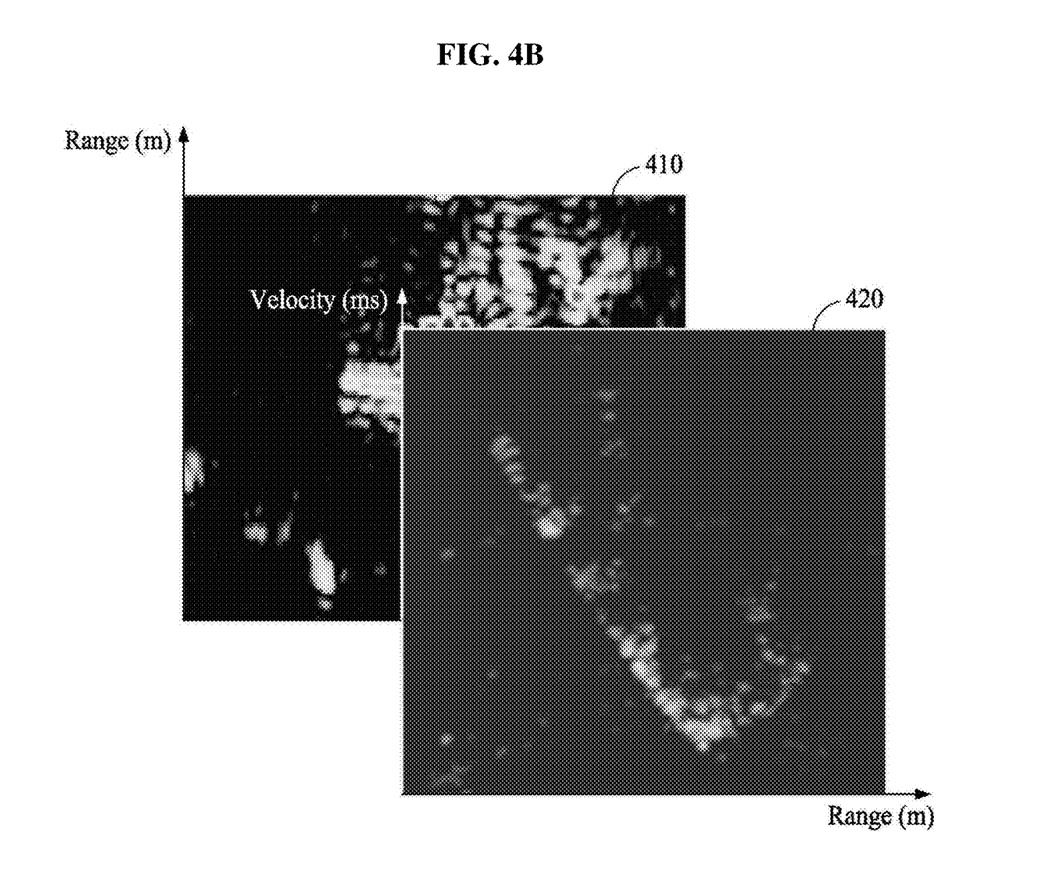
FIG. 4B illustrates an example of a range-angle image and a range-velocity image.
Figure 4C:
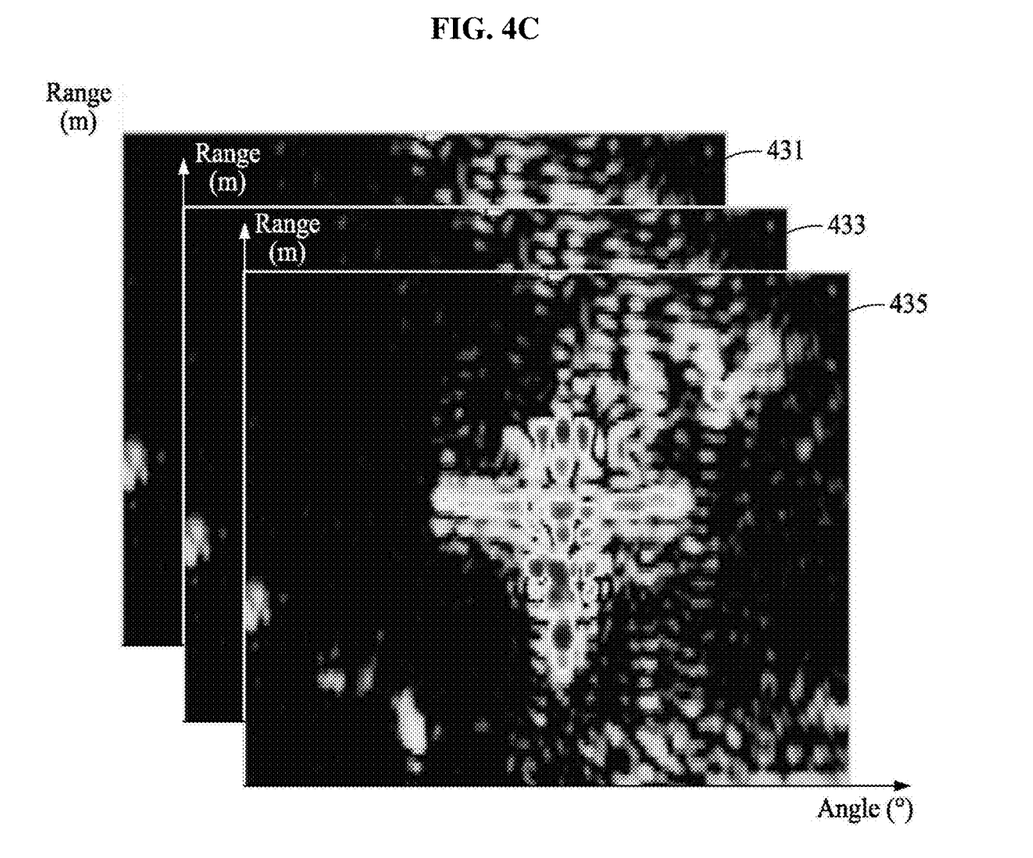
FIG. 4C illustrates an example of first composite images generated by combining range-angle images and range-velocity images corresponding to polarized waves.

FIG. 4A illustrates an example of a range-angle image. FIG. 4B illustrates an example of a range-angle image and a range-velocity image. FIG. 4C illustrates an example of first composite images generated by combining range-angle images and range-velocity images corresponding to polarized waves.

Referring to FIG. 4A, an object identification apparatus generates a 2D range-angle image 410 based on range information and angle information for each of polarized waves. Referring to FIG. 4B, the object identification apparatus generates a 3D first composite image by synthesizing velocity information with the 2D range-angle image 410. The velocity information is included in a form of a 2D image in a range-velocity image 420.

Referring to FIG. 4C, the object identification apparatus generates 3D first composite images 431, 433 and 435. The first composite images 431, 433 and 435 each corresponds to the polarized waves. For example, the first composite image 431 corresponds to a V/V polarized wave, the first composite image 433 corresponds to a V/H polarized wave, and the first composite image 435 corresponds to an H/H polarized wave.

Although the first composite images 431, 433 and 435 are expressed in 2D as shown in FIG. 4C, each of the first composite images 431, 433 and 435 may be expressed as a 3D image including range information, angle information, and velocity information.

Figure 5A:
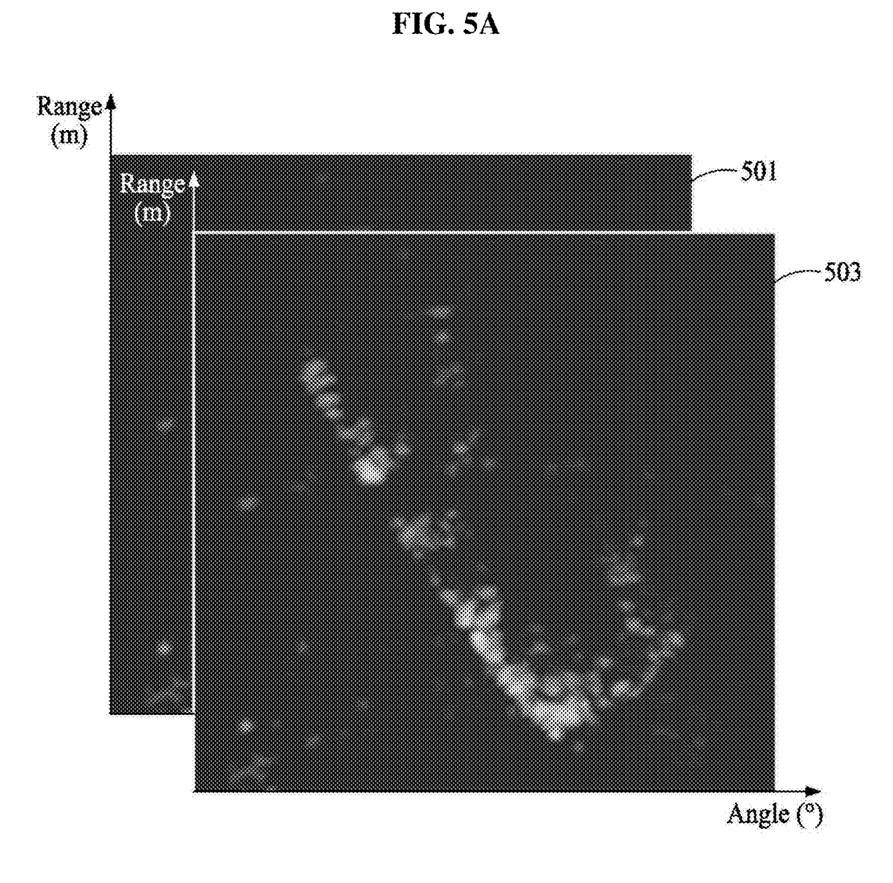
FIG. 5A illustrates an example of cross-correlation images corresponding to polarization pairs.
Figure 5B:
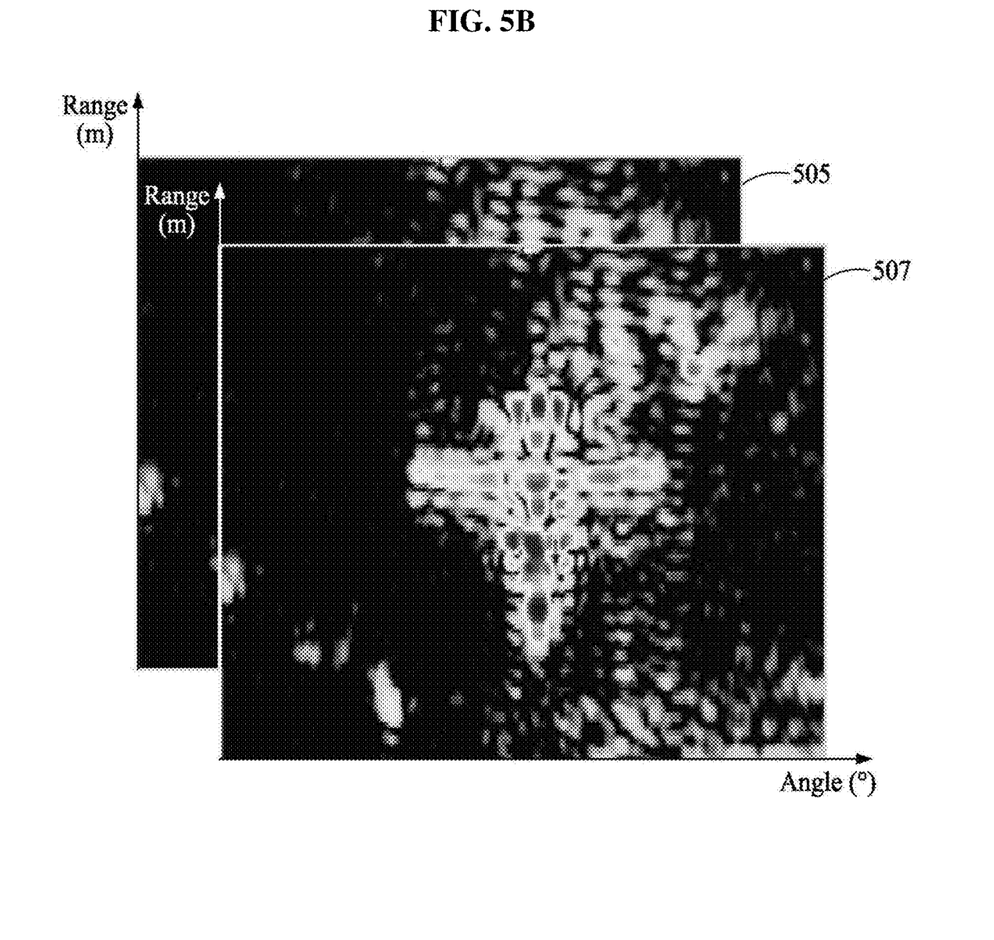
FIG. 5B illustrates an example of differential images corresponding to pairs of polarization pairs.

FIG. 5A illustrates examples of cross-correlation images corresponding to polarization pairs. FIG. 5B illustrates examples of differential images corresponding to polarization pairs.

An object identification apparatus generates a cross-correlation image between composite images. A cross-correlation is a degree of a correlation between different signals. The cross-correlation image is an image generated by setting a correlation between pixels corresponding to two different images as a new pixel value. The object identification apparatus generates a cross-correlation image between composite images corresponding to polarization pairs.

FIG. 5A illustrates cross-correlation images 501 and 503. The cross-correlation image 501 is a cross-correlation image between the first composite images 431 and 433. The cross-correlation image 503 is a cross-correlation image between the first composite images 433 and 435. For example, the first composite image 431 corresponds to a V/V polarized wave, the first composite image 433 corresponds to a V/H polarized wave, and the first composite image 435 corresponds to an H/H polarized wave.

The object identification apparatus generates a differential image between composite images. A difference between pixel values of two composite images is set as a new pixel value, and the differential image is generated. For example, the object identification apparatus generates a differential image between composite images corresponding to each of polarization pairs.

Referring to FIG. 5B, a differential image 505 is a differential image between the first composite images 431 and 433. A differential image 507 is a differential image between the first composite images 433 and 435.

The object identification apparatus 100, the transmission antenna 121, the reception antenna 123, the processor 110 and other apparatuses, units, modules, devices, and other components described herein with respect to FIG. 1 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of identifying an object, the method comprising:
    extracting first location information, second location information, and motion information of an object from a polarimetric RADAR signal that is reflected from the object, wherein each of the first location information, the second location information, and the motion information correspond to each of polarized waves in a multi polarization;
    generating a first image comprising the first location information and the second location information for the each of the polarized waves;
    generating a second image comprising the first location information and the motion information for the each of the polarized waves;
    combining the first image and the second image for each of the respective polarized waves to generate first composite images; and
    identifying the object using a neural network based on the first composite images.

2. The method of claim 1, wherein the identifying of the object comprises:
    inputting a second composite image generated by combining the first composite images to the neural network to identify the object.

3. The method of claim 1, wherein
    the first location information is range information,
    the second location information is angle information,
    the first image is a range-angle image, and
    the second image is a range-velocity image.

4. The method of claim 1, wherein
    the first location information is vertical direction information,
    the second location information is horizontal direction information,
    the first image is a vertical direction-horizontal direction image, and
    the second image is a vertical direction-velocity image.

5. The method of claim 1, further comprising:
    in response to determining that a signal-to-noise ratio (SNR) of the polarimetric RADAR signal satisfies a criterion, determining the first location information to be range information, determining the second location information to be angle information, determining the first image to be a range-angle image, and determining the second image to be a range-velocity image, and
    in response to determining that the SNR being does not satisfy the criterion, determining the first location information to be vertical direction information, determining the second location information to be horizontal direction information, determining the first image to be a vertical direction-horizontal direction image, and determining the second image to be a vertical direction-velocity image.

6. The method of claim 1, wherein the polarimetric RADAR signal comprises a vertical/vertical (V/V) polarization signal, a vertical/horizontal (V/H) polarization signal, a horizontal/vertical (H/V) polarization signal and a horizontal/horizontal (H/H) polarization signal.

7. The method of claim 1, wherein the polarimetric RADAR signal comprises a left-handed circular polarization (LHCP)/right-handed circular polarization (RHCP) signal, an LHCP/LHCP signal, an RHCP/LHCP signal, and an RHCP/RHCP signal.

8. The method of claim 1, further comprising:
    generating differential images between the first composite images; and
    inputting a third composite image generated by combining the differential images to the neural network to identify the object.

9. The method of claim 1, further comprising:
    generating cross-correlation images between the first composite images; and inputting a fourth composite image generated by combining the cross-correlation images to the neural network to identify the object.

10. A non-transitory computer-readable storage medium storing instructions that, when executed by a processor, cause the processor to perform the method of claim 1.

11. An apparatus to identify an object, the apparatus comprising:
a processor configured to
extract first location information, second location information, and motion information of an object from a polarimetric RADAR signal reflected from the object, wherein each of the first location information, the second location information and the motion information correspond to each of polarized waves in a multi-polarization;
generate a first image comprising the first location information and the second location information for the each of the polarized waves;
generate a second image comprising the first location information and the motion information for the each of the polarized waves;
combine the first image and the second image for the each of the respective polarized waves to generate first composite images; and
identify the object using a neural network based on the first composite images.

12. The apparatus of claim 11, wherein the processor is further configured to input a second composite image generated by combining the first composite images to the neural network to identify the object.

13. The apparatus of claim 11, wherein
the first location information is range information,
the second location information is angle information,
the first image is a range-angle image, and
the second image is a range-velocity image.

14. The apparatus of claim 11, wherein
the first location information is vertical direction information,
the second location information is horizontal direction information,
the first image is a vertical direction-horizontal direction image, and
the second image is a vertical direction-velocity image.

15. The apparatus of claim 11, wherein
the processor is further configured to determine whether a signal-to-noise ratio (SNR) of the polarimetric RADAR signal satisfies a predetermined criterion,
in response to the SNR being determined to satisfy the criterion, the processor determines the first location information to be range information, the second location information to be angle information, the first image to be a range-angle image, and the second image to be a range-velocity image, and
in response to the SNR being determined not to satisfy the criterion, the processor determines the first location information to be vertical direction information, the second location information to be horizontal direction information, the first image to be a vertical direction-horizontal direction image, and the second image to be a vertical direction-velocity image.

16. The apparatus of claim 11, wherein the polarimetric RADAR signal comprises a vertical/vertical (V/V) polarization signal, a vertical/horizontal (V/H) polarization signal, a horizontal/vertical (H/V) polarization signal and a horizontal/horizontal (H/H) polarization signal.

17. The apparatus of claim 11, wherein the polarimetric RADAR signal comprises a left-handed circular polarization (LHCP)/right-handed circular polarization (RHCP) signal, an LHCP/LHCP signal, an RHCP/LHCP signal, and an RHCP/RHCP signal.

18. The apparatus of claim 11, wherein the processor is further configured to generate differential images between the first composite images, and to input a third composite image generated by combining the differential images to the neural network to identify the object.

19. The apparatus of claim 11, wherein the processor is further configured to generate cross-correlation images between the first composite images, and to input a fourth composite image generated by combining the cross-correlation images to the neural network to identify the object.

20. The apparatus of claim 11, further comprising:
a transmission antenna configured to radiate the polarimetric RADAR signal to the object; and
a reception antenna configured to receive the reflected polarimetric RADAR signal from the object.

* * * * *